(12) United States Patent
Tani et al.

(10) Patent No.: US 8,206,472 B2
(45) Date of Patent: Jun. 26, 2012

(54) FIXED ABRASIVE WIRE

(75) Inventors: Yasuhiro Tani, Tokyo (JP); Yukinobu Tokunaga, Yamaguchi (JP); Kazumasa Tsuchihashi, Yamaguchi (JP)

(73) Assignee: Japan Fine Steel Co., Ltd., Sanyoonoda-shi (JP)

( * ) Notice: Subject to any disclaimer, the term of this patent is extended or adjusted under 35 U.S.C. 154(b) by 235 days.

(21) Appl. No.: 11/571,121

(22) PCT Filed: Dec. 27, 2005

(86) PCT No.: PCT/JP2005/023877
§ 371 (c)(1),
(2), (4) Date: Feb. 27, 2007

(87) PCT Pub. No.: WO2007/039934
PCT Pub. Date: Apr. 12, 2007

(65) Prior Publication Data
US 2008/0261499 A1  Oct. 23, 2008

(51) Int. Cl.
 *B24D 3/00*  (2006.01)
 *B24D 99/00*  (2010.01)
(52) U.S. Cl. .................. 51/293; 51/307; 51/309
(58) Field of Classification Search .......... 51/307; 451/528
See application file for complete search history.

(56) References Cited

U.S. PATENT DOCUMENTS 4,866,888 A * 9/1989 Murai et al. .................. 451/533
6,194,068 B1   2/2001 Ohashi et al.

FOREIGN PATENT DOCUMENTS

| JP | 03079264   | 4/1991  |
|----|-----------|---------|
| JP | 05-138537 | 6/1993  |
| JP | 06-114741 | 4/1994  |
| JP | 2000246654| 9/2000  |
| JP | 2000-343436| 12/2000|
| JP | 2002-178266| 6/2002 |
| JP | 2003-340729| 12/2003|
| JP | 2003340729 | 12/2003|
| JP | 2004-338023| 12/2004|

OTHER PUBLICATIONS

Supplementary European Search Report for EP 05 82 2696, dated Sep. 19, 2007.
Office Action for Chinese Patent Application No. 200580001751.4, dated Nov. 3, 2010.

* cited by examiner

*Primary Examiner* — Jerry Lorengo
*Assistant Examiner* — Jared Wood
(74) *Attorney, Agent, or Firm* — Marshall, Gerstein & Borun LLP

(57) ABSTRACT

There is provided a fixed abrasive wire having abrasives fixed thereon with a superior fixing strength. The abrasives are fixed on the wire by electroplating in which the wire is subjected to a degreasing step, an acid cleaning step, a rinsing step and an electroplating step sequentially. A plating liquid used in the electroplating step contains a nickel-containing organic acid or a nickel-containing inorganic acid, a leveling agent, and the abrasives. It is a feature that a plated coat being over the top of each of the abrasives has a smaller thickness than a theoretical value.

6 Claims, 12 Drawing Sheets

US 8,206,472 B2

FIXED ABRASIVE WIRE

TECHNICAL FIELD

The present invention relates to a fixed abrasive wire and, more particularly, to a fixed abrasive wire having abrasives fixed thereon for use in cutting, slicing, internal grinding, dicing and ingot-cutting of such rigid materials as silicon, quartz, ceramics and the like.

BACKGROUND ART

A wire saw using a fixed abrasive wire is one example of an apparatus which is configured to run lines of fine wire imparted with tension, press an object to be cut (for example, silicon ingot) against the lines of wire while spraying a slurry of abrasive material containing abrasives to the lines of wire, and cut the object into wafers by utilizing the grinding properties of loose abrasives. Since this apparatus is capable of obtaining plural wafers at a time, the process making use of the apparatus is called a multicutting method. FIG. 14 is an example of a schematic illustration of the construction of a wire saw apparatus for use in machining single-crystalline silicon.

Referring briefly to FIG. 14, wire 42 fed from a feed bobbin 41 passes through many guide rollers 43 arranged to guide the wire and then forms lines of wire with predetermined intervals at plural groove rollers 44 each having many grooves. A feed unit 45 presses an object 46 to be cut against the lines of wire, while a slurry of loose abrasives is sprayed on the lines of wire from nozzle 47, whereby the object 46 is cut into wafers. Thereafter, the lines of wire are passed through many guide rollers 48 and then taken up by a take-up bobbin 49. The wire 42 is driven by the driving power of a drive motor 50 associated with the groove rollers 44. During running of the wire 42, data about movements of dancer rollers 51 and 52 is fed back to rotation of each of the feed bobbin 41 and take-up bobbin 49 to maintain the tension of the wire 42 constant. Usually, the wire 42 advances with bidirectional or unidirectional run to meet requests for effective utilization of the wire 42 as a material and improvements in the quality of the resulting products such as improvement in cut surface roughness and is finally taken up by the take-up bobbin 49.

Generally, a dispersion of abrasives of silicon carbide in a lubricant is often used as the above slurry of loose abrasives. Such a lubricant is usually a mineral oil. However, such a mineral oil lubricant requires an organic solvent for cleaning, which raises an environmental problem and, for this reason, a change for a water-soluble lubricant based on a glycol-type solvent is now under way. Such a wire saw using loose abrasives is characterized in that: (1) since the wire saw is of the type configured to cut the whole of an object to be cut at a stroke, the wire saw is capable of handling large amounts of objects even though its cutting speed is not high; (2) since the cutting tool is wire, an object to be cut having a large bore diameter can be cut relatively easily; and (3) since cutting is achieved relying upon the grinding properties of loose abrasives while using a fine wire as the cutting tool, the object can be cut into thin wafers. On the other side, the wire saw has such drawbacks that: the use of a slurry of loose abrasives causes the abrasives to scatter on the workbench, thereby contaminating the working environment due to dryness of the abrasives; and disposal of waste and cleaning of wafers are required.

As means for eliminating these drawbacks, a fixed abrasive wire has been proposed which is made by attaching diamond abrasives or the like to a wire by means of a thermosetting or photosetting resin binder and then allowing the resin to thermoset or photoset thereby to fix the abrasives to the wire. However, because the fixing or bonding strength obtained by the method of attaching abrasives to the wire by such a resin is not sufficient, there is fear that the abrasives fall off due to friction caused by cuffing during the process of cutting the object into wafers by intense reciprocation of the wire.

In attempt to solve the above problems associated with the wire saw using loose abrasives and the wire saw obtained by attachment of abrasives to the wire by means of resin, patent documents 1 to 3 have proposed abrasive electrodeposited wire saws of the type in which abrasives are fixed on a wire by an electrolytic process.

Patent document 1 discloses a diamond electrodeposited wire or ribbon having a first electrodeposited layer 63 comprising coarse diamond abrasives 62 electrodeposited on a wire or ribbon 61, and a second electrodeposited layer 65 comprising electrodeposited diamond abrasives 64 which are considerably finer than the abrasives 62, in which the second electrodeposited layer 65 is put on the first electrodeposited layer 63, as shown in FIG. 15.

Patent document 2 discloses an abrasive coated wire having an electroplated layer 73 for allowing abrasives 72 to be implanted to the surface of a wire 71, and an electroless-plated layer 74 formed on the outer side of the electroplated layer 73 for reinforcing the implanted condition of the abrasives 72, as shown in FIG. 16.

Patent document 3 discloses a wire saw comprising a coating of a soft plated layer 82 on the surface of a wire 81, and a coating of a hard plated layer 83 on the soft plated layer 82, the two plated layers fixing superabrasives 84 on the wire 81, wherein an inner end 85 of the superabrasives 84 is within the soft plated layer 82 while an outer end 86 of the superabrasives 84 is exposed from the hard plated layer 83 and situated on the same cylindrical surface, as shown in FIG. 17.

Patent document 1: Japanese Patent Provisional Publication No. SHO 63-22275

Patent document 2: Japanese Patent Provisional Publication No. HEI 9-1455

Patent document 3: Japanese Patent Provisional Publication No. HEI 9-150314

DISCLOSURE OF INVENTION

Problems to be Solved by Invention

The inventor of the present invention has found out that, though the fixing strength of abrasives to the plated layer in each of the abrasive electrodeposited wires shown in FIGS. 15 to 17 is superior to the fixing strength of attachment of abrasives to the wire by resin, the wire with abrasives each having a top exposed from the plated layer as shown in each of FIGS. 15 to 17 has no abrasive fixing strength such as can sufficiently stand practical use and the abrasives have fallen off in a relatively short time because of a very large frictional force resulting from cutting during the process of cutting the object into wafers by intense reciprocation of the wire in the wire saw.

The inventor of the present invention produced an abrasive electrodeposited wire in which Ni-coated diamond abrasives obtained by coating abrasives (diamond) with the same metal component (nickel) as that of a plated layer were fixed to a wire by an electrolytic process. The resulting abrasive electrodeposited wire has an appearance as shown in FIG. 18. In FIG. 18, a diamond abrasive is present within a projecting portion 91. In this abrasive electrodeposited wire, however, a portion extending from a substantially flat portion to the projecting portion 91 is depressed inwardly to form a recess portion, as shown in FIGS. 6(b) and 6(c) below. In this case, the inventor of the present invention has also found out that the fixing strength of abrasives to the plated layer is insufficient to stand practical use and the abrasives have fallen off in a relatively short time because of stress concentration at this recess portion.

The present invention has been made in view of such problems with the conventional art. Accordingly, it is an object of the present invention to provide a fixed abrasive wire having abrasives fixed thereon with a high fixing strength.

Means for Solving Problems

In order to attain the above object, the present invention provides a fixed abrasive wire characterized in that the wire has a surface coated with a metal-plated layer containing plural abrasives embedded therein, the surface of metal-plated layer having curved-surface projecting portions each incorporating abrasives shaped to project from a substantially flat portion, wherein each of the curved-surface projecting portions has a height of H to a surface of the substantially flat portion and a horizontal sectional area of the curved-surface projecting portion increases as the curved-surface projecting portion extends from a height level of (⅓)H to the surface of the substantially flat portion.

The present invention also provides a fixed abrasive wire characterized in that the wire has a surface coated with a metal-plated layer containing plural abrasives embedded therein, the surface of metal-plated layer having curved-surface projecting portions each incorporating abrasives shaped to project from a substantially flat portion, wherein a portion extending from the substantially flat portion to each of the curved-surface projecting portions has no inwardly depressed recess portion and a tangent to the portion extending from the substantially flat portion to each of the curved-surface projecting portions varies continuously.

The fixed abrasive wire according to the present invention has a feature that a plated coat being over the top of each of the abrasives has a smaller thickness than a theoretical value.

Preferably, the abrasives are previously coated with the same metal as part or whole of the metal-plated layer.

Effects of the Invention

The fixed abrasive wire according to claim 1 is characterized in that the wire has a surface coated with a metal-plated layer containing plural abrasives embedded therein, the surface of metal-plated layer having curved-surface projecting portions each incorporating abrasives shaped to project from a substantially flat portion, wherein each of the curved-surface projecting portions has a height of H to a surface of the substantially flat portion and a horizontal sectional area of the curved-surface projecting portion increases as the curved-surface projecting portion extends from a height level of (⅓)H to the surface of the substantially flat portion. In accordance with this constitution, stress concentration is less likely at the portion extending from the substantially flat portion to each of the curved-surface projecting portions and, hence, the abrasives are hard to fall off even when the wire is subjected to a large frictional force resulting from cutting during the process of cutting an object to be cut. It becomes more preferable as the number of such projecting portions increases. Preferably, at least 80% of all the projecting portions have the above-described feature.

The fixed abrasive wire according to claim 2 is characterized in that the wire has a surface coated with a metal-plated layer containing plural abrasives embedded therein, the surface of metal-plated layer having curved-surface projecting portions each incorporating abrasives shaped to project from a substantially flat portion, wherein a portion extending from the substantially flat portion to each of the curved-surface projecting portions has no inwardly depressed recess portion and a tangent to the portion extending from the substantially flat portion to each of the curved-surface projecting portions varies continuously. In accordance with this constitution, stress concentration is less likely at the portion extending from the substantially flat portion to each of the curved-surface projecting portions and, hence, the abrasives are hard to fall off even when the wire is subjected to a large frictional force resulting from cutting during the process of cutting an object to be cut. It becomes more preferable as the number of such projecting portions increases. Preferably, at least 80% of all the projecting portions have the above-described feature.

The fixed abrasive wire according to claim 3 has the feature that a plated coat being over the top of each of the abrasives has a smaller thickness than a theoretical value. In accordance with this constitution, a plated coat covering the foot portion of each projecting portion which contributes effectively to the fixing of the abrasives to the plated coat has a relatively large thickness and, hence, the abrasive fixing strength by the plated coat becomes high.

[Description of Reference Characters]

Figure 1:
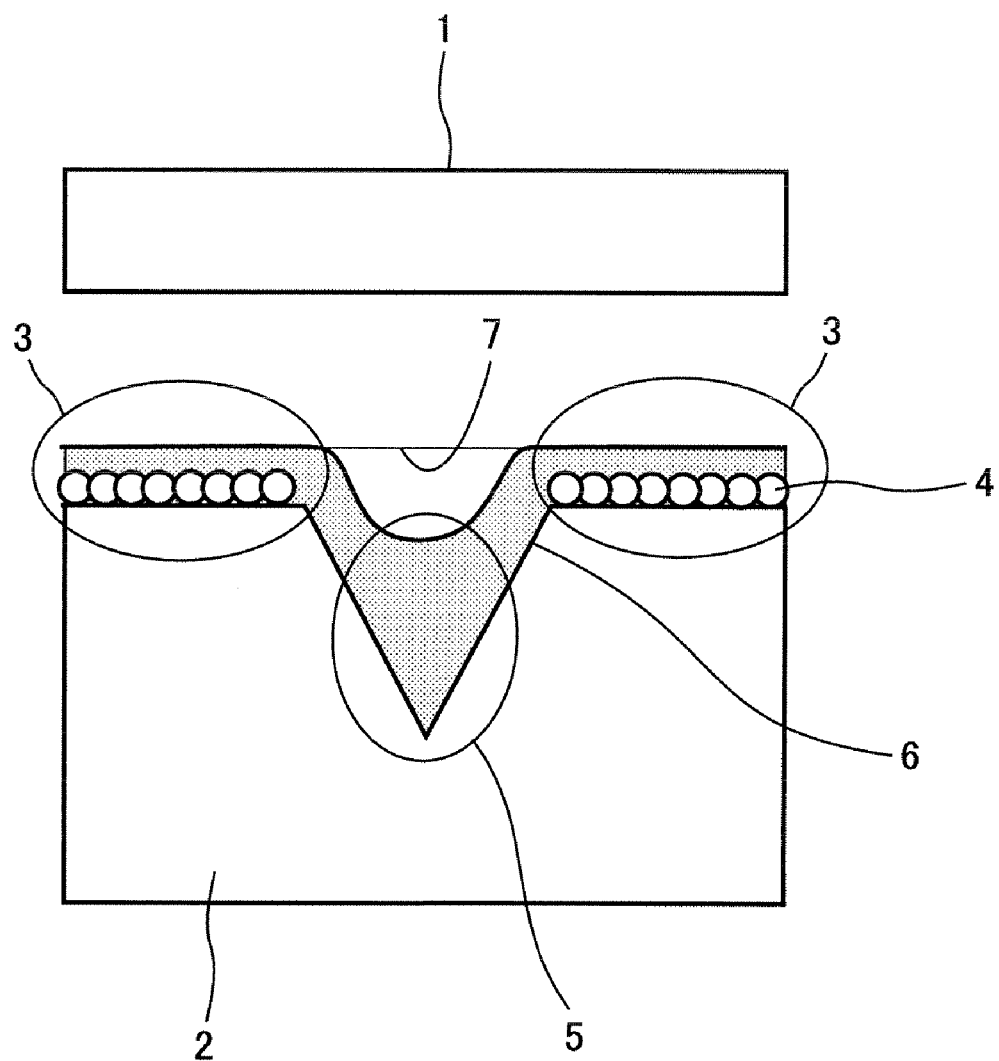
FIG. 1 is a view illustrating the action of smoothing a plated coat surface by a leveling agent.

| | |
|---|---|
| 1 | anode |
| 2 | object metal |
| 3 | high current section |
| 4 | additive |
| 5 | low current section |
| 6 | plated coat |
| 7 | smooth level |
| 10 | anode |
| 11 | abrasive |
| 12 | high current section |
| 13 | plated coat |
| 14 | low current section |
| 15 | top portion |
| 16 | foot portion |
| 17 | abrasive |
| 21 | feed device |
| 22 | steel wire |
| 23 | alkaline cleaning tank |
| 24 | acid cleaning tank |
| 25 | rinse tank |
| 26 | pretreatment tank |
| 27 | plating tank |
| 28 | rinse tank |
| 29 | take-up device |
| 30 | curved-surface projecting portion |
| 31 | substantially flat portion |
| 32 | curved-surface projecting portion |
| 34a | recess portion |
| 34b | recess portion |
| 35 | wire |
| 36 | abrasive |
| 37 | nickel-plated layer |
| 38 | curved-surface projecting portion |
| 39 | substantially flat portion |
| 41 | feed bobbin |
| 42 | wire |
| 43 | guide roller |
| 44 | groove roller |
| 45 | feed unit |
| 46 | object to be cut |
| 47 | nozzle |
| 48 | guide roller |
| 49 | take-up bobbin |
| 50 | drive motor |
| 51 | dancer roller |
| 52 | dancer roller |

BEST MODE FOR CARRYING OUT THE INVENTION

The fixed abrasive wire of the present invention can employ any wire without particular limitation as long as the wire can be electroplated and has sufficient strength and elasticity modulus to stand the tension working between guide rollers or groove rollers. Examples of such wires include steel wires such as a piano wire, and metal wires such as a tungsten wire and a molybdenum wire.

The diameter of the wire for use in the present invention can be appropriately selected to meet the shape and characteristics of the object to be cut. Usually, a diameter of from about 0.01 to about 0.5 mm is often selected. However, the advantage of the present invention remains the same whether a thin wire having a diameter of not more than 0.1 mm or a relatively thick wire having a diameter of more than 0.1 mm is used.

Preferably, the surface of the wire is subjected to degreasing and cleaning prior to electroplating. Degreasing can be achieved by any method without particular limitation. Examples of such methods include acid dipping, solvent degreasing, emulsion degreasing, and alkaline cleaning. Electrolytic degreasing may be additionally performed to finish degreasing when required.

The wire subjected to alkaline cleaning is preferably neutralized by being passed through an acid cleaning tank. The acid for use in the acid cleaning tank may be of any type without particular limitation, but is preferably sulfuric acid, hydrochloric acid or nitric acid, for example.

The wire passed through the acid cleaning tank is preferably rinsed with water by being passed through a rinse tank.

Preferably, the wire is subjected to a pretreatment prior to electroplating. The pretreatment, which is a treatment for improving the adhesion of the plated layer, may comprise strike plating, for example, but is not limited thereto.

There is no particular limitation on the method of electroplating the surface of the wire subsequently to the pretreatment. For example, a plated layer can be formed over the wire surface by electroplating in which the cathode is connected to the wire and the anode is connected to the plating liquid. In producing the fixed abrasive wire of the present invention, it is possible to use, for example, a plating liquid including a nickel-containing organic acid or a nickel-containing inorganic acid, and abrasives. Such a nickel-containing organic acid may be a nickel sulfamate plating liquid, but is not particularly limited thereto.

Preferably, the abrasives are previously coated with the same metal as part or whole of the plated layer. This is because the affinity or intimacy between the abrasives and the plated layer becomes better and, hence, the fixing strength of the abrasives can be expected to be enhanced. There is no particular limitation on the abrasives to be used, but diamond abrasives having a diameter of not more than 100 μm can be used.

Preferably, the plating liquid further contains a leveling agent. As described below, the addition of the leveling agent can be expected to enhance the strength of fixing the abrasives to the plated layer, allow the abrasives to exert a predetermined cutting ability immediately after start of the cutting operation, and bring about the effect of making it difficult for swarf produced by cutting to remain on the wire surface.

(Smoothing of a Plated Coat by a Leveling Agent)

The leveling agent is added to facilitate the smoothing of a plated coat and impart a gloss to the plated coat. The surface of the plated coat can be smoothed by a mechanism as described below.

As shown in FIG. 1 schematically illustrating an electroplating method in which reference numeral 1 designates an anode and reference numeral 2 designates an object metal (cathode) to be plated, when the plating liquid contains the leveling agent, an additive 4 such as the leveling agent is preferentially absorbed to a high current section 3 of the surface of the object metal 2 which is close to the anode 1. As a result, the surface of the object metal 2 to which the additive 4 is absorbed acts as a resistance and, accordingly, the potential of the high current section 3 of the surface of the object metal 2 and that of a low current section 5 inwardly depressed from the surface and being relatively remotely from the anode 1 are reversed each other, so that the growth rate of plated coat 6 in the low current section 5 becomes higher than that in the high current section 3. Thus, the plated coat 6 grows according to this mechanism until the plated coat 6 forms a smooth level 7 finally.

(Improvement in the Fixing Strength of Abrasives to Plated Coat, Earlier Exertion of Cutting Ability of Abrasives and Prevention of Residual Swarf by the Leveling Agent)

By adding the leveling agent to the plating liquid, it is possible to make abrasives excellent in fixing strength to a plated coat and hard to fall off according to the following mechanism utilizing the action of the leveling agent ingeniously.

Figure 2:
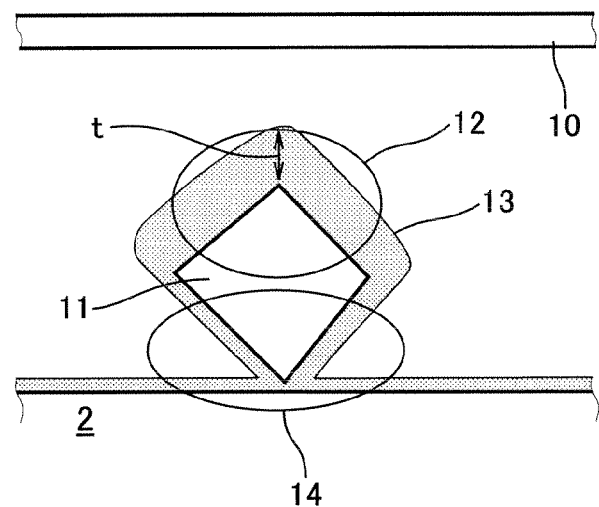
FIG. 2 is a view illustrating how a plated coat grows in general electroplating.

As shown in FIG. 2, in fixing abrasive 11 previously coated with the same metal as the metal to be plated to the object metal 2 by electrolysis in a typical electroplating process, the growth rate of plated coat 13 in a high current section 12 on the surface of the object metal 2 which is close to an anode 10 is higher than that in a low current section 14 being relatively remotely from the anode 10. However, since the plating liquid contains the leveling agent at the electroplating process, the growth rate of plated coat in the low current section 14 becomes higher than that in the high current section 12, as described above with reference to FIG. 1. That is, the growth of plated coat on the top portion 15 of the abrasive 11 which is closer to the anode 10 becomes suppressed while the growth of plated coat 13 on the foot portion 16 which effectively contributes to fixing of the abrasive 11 to the plated coat 13 becomes accelerated as shown in FIG. 3, thus enhancing the strength of fixing the abrasive 11 by the plated coat 13.

It is the abrasive 11 that performs the cutting operation actually, and the plated coat 13 acts to fix the abrasive 11 so as to prevent the abrasive 11 from failing off during the cutting operation. When the amount of plated coat 13 in the portion which is over the abrasive 11 and does not effectively contribute to the cutting operation is smaller than that in the foot portion 16 as shown in FIG. 3, the plated coat 13 being over the abrasive 11 is removed to expose the top portion of the abrasive 11 relatively early after the start of cutting and, hence, the abrasive 11 exerts the cutting ability inherent thereto quickly after the start of cutting operation.

Figure 3:
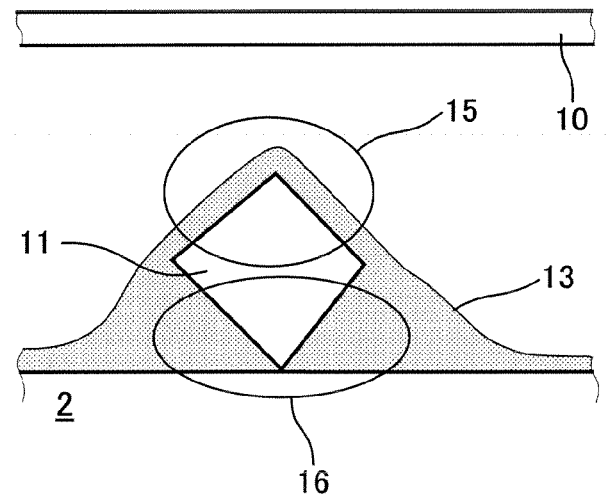
FIG. 3 is a view illustrating how a plated coat grows in an electroplating bath containing a leveling agent in the case where abrasives are previously coated with the same metal as a metal to be electroplated.

Further, the plated coat 13 is shaped to have no recess portion by increasing the thickness of plated coat 13 covering the foot portion 16 being close to the object metal 2 as shown in FIG. 3. Such a shape can be expected to bring about the additional effect of making swarf produced during cutting hard to remain on the surface of the object metal 2 as compared with the shape shown in FIG. 2.

Figure 4:
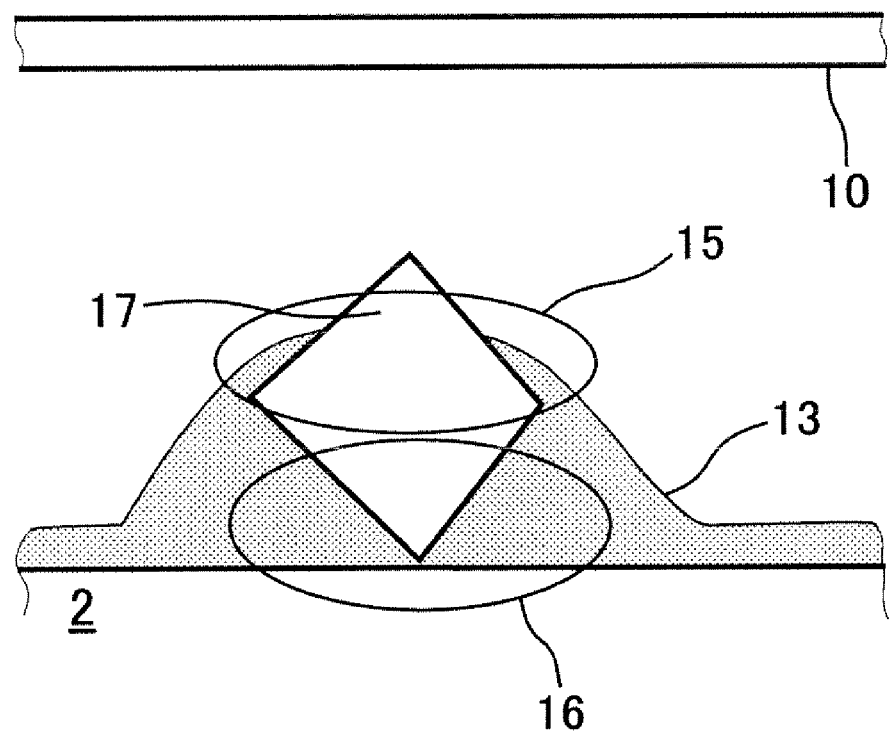
FIG. 4 is a view illustrating how a plated coat grows in an electroplating bath containing a leveling agent in the case where abrasives are not previously coated with the same metal as a metal to be electroplated.

The effect of suppressing the growth of plated coat on the top portion 15 of abrasive 11 while accelerating the growth of plated coat on the foot portion 16 can also be expected to result based on the same principle as described above even in the case where abrasive 17 not previously coated with the same metal as the metal to be plated is fixed to the object metal 2 by an electrolytic process. Thus, the thickness of plated coat 13 on the top portion 15 of abrasive 17 is made small whereas the thickness of plated coat 13 on the foot portion 16 made large, as shown in FIG. 4.

The leveling agent acts to facilitate smoothing of a plated coat and impart a gloss to the plated coat. The leveling agent added to the plating liquid as described above is deposited on the surface of the object metal 2 together with metal ion. For this reason, a substance that acts to lower the cathode potential serves as the leveling agent under suitable conditions. Since leveling agents of different types have different functions, use of leveling agents of different types in combination makes it possible to obtain a uniform leveling effect even on an article of a complicated shape. Leveling agents include substances generally called type 1 brighteners and substances generally called type 2 brighteners. The type 1 brighteners have such a characteristic as to provide a gloss similar to the gloss of a basis material easily. On the other hand, the type 2 brighteners are excellent in gloss improving effect. When used alone, the type 2 brighteners make a plated coat brittle and cause an adhesion failure of the plated coat to occur. For this reason, it is preferable to use a combination of a type 1 brightener and a type 2 brightener.

The type 1 brighteners are organic compounds having the structure: $=\!\!C\!\!-\!\!SO_2\!\!-$. Examples of such organic compounds include 1,5-naphthalene-sodium disulfonate, 1,3,6-naphthalene-sodium trisulfonate, and saccharin.

Organic compounds which can be used as the type 2 brighteners each have a respective one of the structures: $C\!\!=\!\!O$ (various aldehydes), $C\!\!=\!\!C$ (gelatin), $C\!\!\equiv\!\!C$ (2-butin-1,4-diol), $C\!\!=\!\!N$ (quinaldine, pyridium compound), $C\!\!\equiv\!\!N$ (ethylenecyanohydrin), $N\!\!-\!\!C\!\!=\!\!S$ (thiourea), $N\!\!=\!\!N$ (azo dye), and the like.

For the above-described effects of the present invention to be exercised, the plating liquid preferably contains a type 1 brightener in an amount of 1 to 50 milliliter/liter and a type 2 brightener in an amount of 1 to 150 milliliter/liter wherein the weight ratio between the type 1 brightener and the type 2 brightener is 1 (the former) against 2 to 5 (the latter).

The wire thus electroplated is preferably rinsed with water by being passed through a rinse tank.

After having been subjected to electroplating, the wire is preferably subjected to dressing (grinding) so as to have a suitable surface configuration for a wire saw.

Example

Hereinafter, examples of the present invention will be described. However, the present invention is not limited to the examples below, but may be appropriately changed and modified without departing from the technical scope of the present invention.

(1) Production of a Fixed Abrasive Wire by Electroplating

Figure 5:
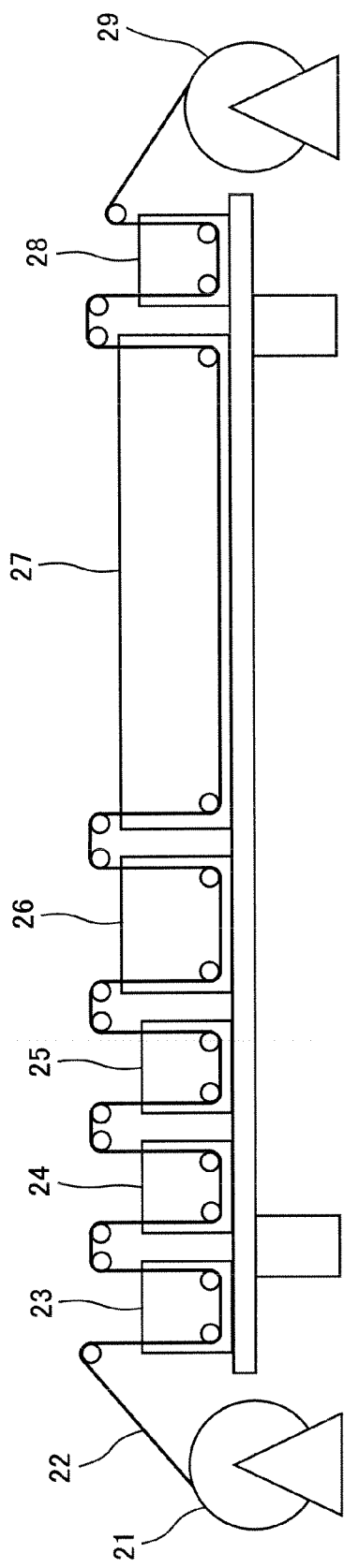
FIG. 5 is a view schematically showing the construction of plating equipment suitable for producing a fixed abrasive wire according to the present invention.

A fixed abrasive wire was produced using plating equipment having a constitution schematically shown in FIG. 5. Specifically, a feed device 21 fed a steel wire 22 having a diameter of 160 µm. The steel wire 22 was subjected to alkaline cleaning at an alkaline cleaning tank (containing an alkaline degreaser of pH 11) 23, acid cleaning at an acid cleaning tank (containing sulfuric acid of pH 1) 24, rinsing with water at a rinse tank 25, and then pretreatment at a pretreatment tank (having a bath composition of pH 4.2 comprising nickel sulfamate 4-hydrate in an amount of 600 g/liter) 26. The steel wire 22 thus was nickel-plated to a thickness of 7 µm at a plating tank 27. The plating bath in the plating tank 27 had a composition comprising nickel sulfamate 4-hydrate in an amount of 600 g/liter, nickel chloride 6-hydrate in an amount of 55 g/liter, boric acid in an amount of 30 g/liter as a pH buffer, a type 1 brightener (saccharin) in an amount of 15 milliliter/liter, a type 2 brightener (2-butin-1,4-diol) in an amount of 50 milliliter/liter, and diamond abrasives previously coated with nickel (to a nickel coat thickness of 0.1 to 1.0 µm) and having a particle diameter of 15 to 25 mm in an amount of 10 g/liter. Plating was conducted under the plating conditions: pH=3.0, temperature=55° C., and current density=45 A/dm$^2$. At that time, the current efficiency was 90%.

Thereafter, the steel wire 22 thus provided with nickel-plated coat was rinsed with water at a rinse tank 28 and then a take-up unit 29 took up the steel wire 22 having the diamond abrasives fixed in the nickel-plated coat.

(2) Surface of the Fixed Abrasive Surface

Figure 6A:
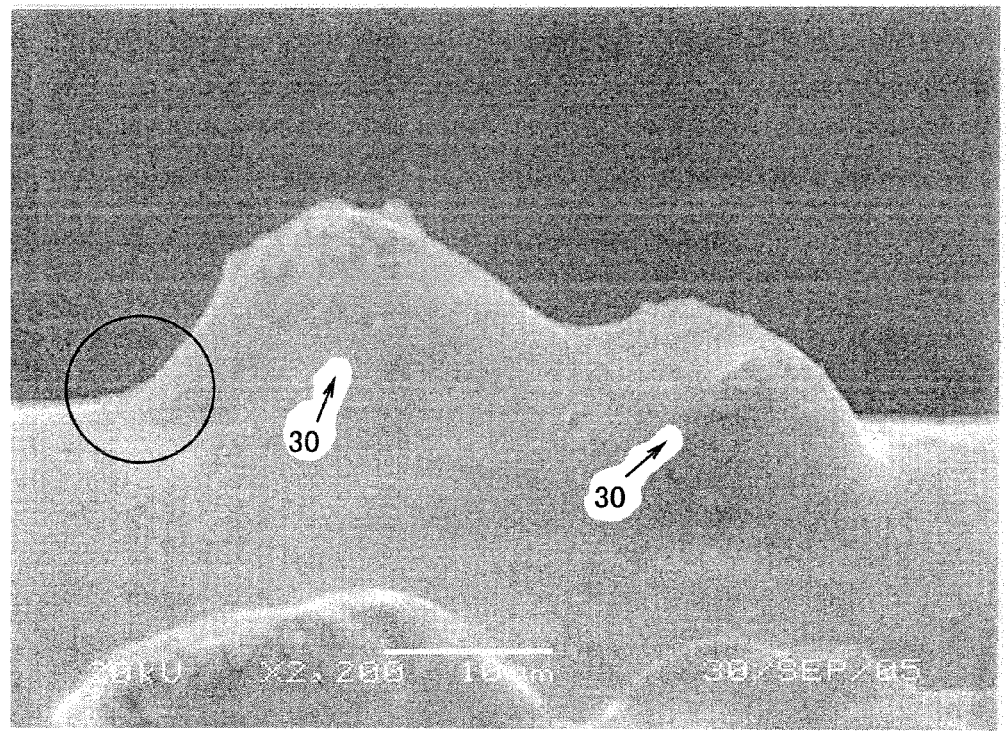
FIG. 6(a) is an enlarged photograph (2000 magnifications) showing a portion of a surface of the fixed abrasive wire of the present invention.

FIG. 6(a) is an enlarged photograph (2200 magnifications) showing a portion of the surface of the fixed abrasive wire of the present invention thus obtained. The surface consists of curved-surface projecting portions 30 each incorporating abrasives therein, and a substantially flat portion, each of the curved-surface projecting portions 30 being shaped to project from the substantially flat portion. The portion indicated by a large circle which extends from the substantially flat portion to curved-surface projecting portion 30 has no inwardly depressed recess portion, and a tangent to the portion extending from the substantially flat portion to curved-surface projecting portion 30 varies continuously.

Figure 6B:
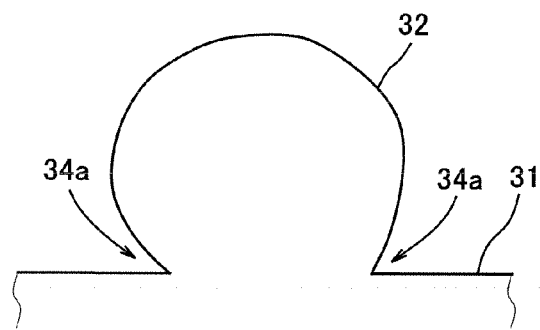
FIG. 6(b) is an enlarged view schematically showing a portion of a surface of another fixed abrasive wire.
Figure 6C:
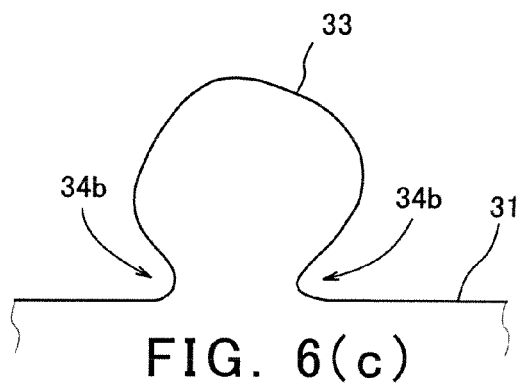
FIG. 6(c) is an enlarged view schematically showing a portion of a surface of yet another fixed abrasive wire.

In contrast, as shown in FIG. 6(b), the surface of another fixed abrasive wire has an inwardly depressed recess portion 34a in a portion extending from a substantially flat portion 31 to a curved-surface projecting portion 32 and, similarly, as shown in FIG. 6(c), the surface of yet another fixed abrasive wire has an inwardly depressed recess portion 34b in a portion extending from a substantially flat portion 31 to a curved-surface projecting portion 33. Stress concentration is likely on these recess portions 34a and 34b.

On the other hand, stress concentration is less likely on the surface of the wire of the present invention because the surface has no inwardly depressed recess portion corresponding to the recess portions 34a or 34b in the portion extending from the substantially flat portion to curved-surface projecting portion 30 and because the line tangent to the portion extending from the substantially flat portion to curved-surface projecting portion 30 varies continuously.

Figure 7A:
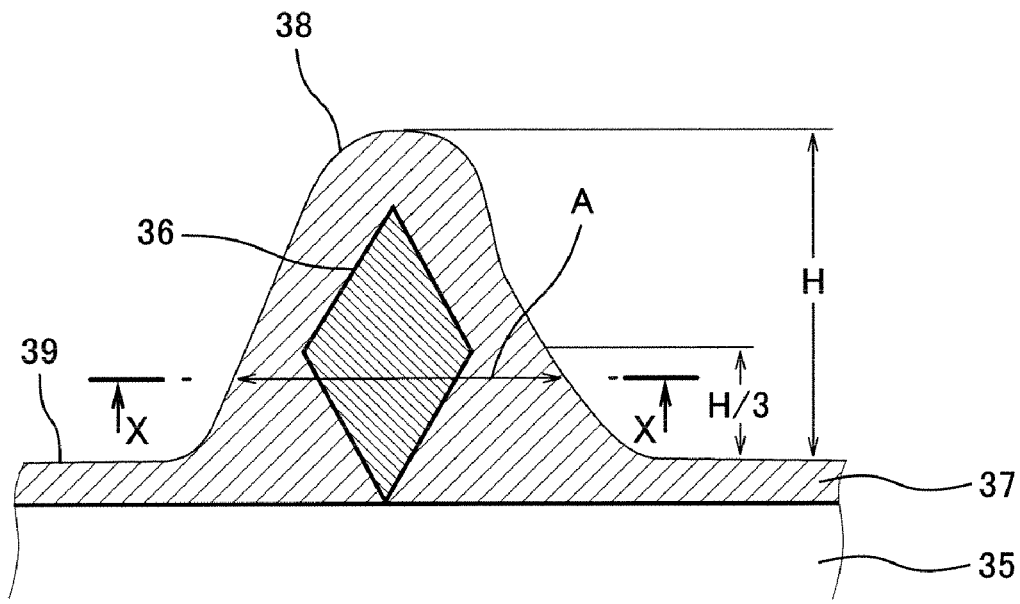
FIG. 7(a) is a view schematically showing part of a longitudinal surface portion of the fixed abrasive wire of the present invention.
Figure 7B:
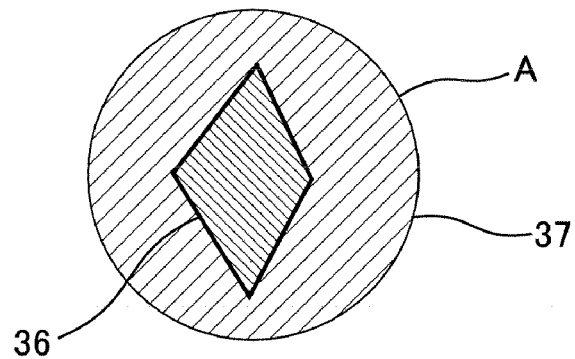
FIG. 7(b) is a sectional view taken on line indicated by arrow X-X in FIG. 7(a).

FIG. 7(a) is a view schematically showing part of a longitudinally surface portion of the fixed abrasive wire of the present invention produced by the above process as observed by a scanning electron microscope having a measuring device. As shown in FIG. 7(a), the surface of the wire 35 is coated with a nickel-plated layer 37 incorporating abrasive 36 therein and a curved-surface projecting portion 38 incorporating the abrasive 36 therein is shaped to project from a substantially flat portion 39. The curved-surface projecting portion 38 has a height of H to the surface of the substantially flat portion 39 and a horizontal sectional area A of the curved-surface projecting portion 38 gradually increases as the curved-surface projecting portion 38 extends from a height level of (⅓)H to the surface of the substantially flat portion 39. Thus, the plated coat in the foot portion which effectively contributes to fixing of the abrasive 36 to the nickel-plated layer 37 has a large thickness and, hence, the abrasive 36 is firmly fixed to the nickel-plated layer (plated coat) 37. FIG. 7(b) is a sectional view taken on line indicated by arrow X-X of FIG. 7(a). Besides the scanning electron microscope having a measuring device, a laser microscope may be used to measure the thickness of plated coat.

(3) Thickness of Plated Coat

Plural steel wires were electroplated under such plating conditions as to form plated coat 13 whose thickness "t" over abrasive 11 as shown in FIG. 2 is theoretically 8 μm, with the bath conditions of each of the tanks from the alkaline cleaning tank 23 to the rinse tank 28 being the same as described above (containing the leveling agents) or the bath conditions of each of the tanks from the alkaline cleaning tank 23 to the rinse tank 28 being the same as described above except the plating bath in the plating tank 27 containing neither a type 1 brightener (leveling agent) nor a type 2 brightener (leveling agent). As a result, the wires electroplated with use of the leveling agents had actual plated coat thicknesses "t" as shown in Table 1 below, and the wires electroplated without use of the leveling agents had actual plated coat thicknesses "t" as shown in Table 2 below.

The thickness "t" of plated coat was measured by a method including: applying a release agent to the internal surface of a non-illustrated cylindrical body; filling the cylindrical body with a thermosetting resin; inserting each wire having plated coat obtained by the above process into the thermosetting resin; heating the thermosetting resin to a predetermined temperature to cause the resin to set; removing the cylindrical thermosetting resin incorporating the wire therein from the cylindrical body; cutting away an end face of the cylindrical thermosetting resin longitudinally to expose a portion having a shape as shown in FIG. 2; and measuring the thickness t using a scanning electron microscope having a measuring device.

TABLE 1

| | thickness "t" | | | | | | |
|---|---|---|---|---|---|---|---|
| | 2 μm | 3 μm | 4 μm | 5 μm | 6 μm | 7 μm | 8 μm |
| number of wires | 6 | 11 | 2 | 0 | 0 | 0 | 0 |

TABLE 2

| | thickness "t" | | | | | | |
|---|---|---|---|---|---|---|---|
| | 2 μm | 3 μm | 4 μm | 5 μm | 6 μm | 7 μm | 8 μm |
| number of wires | 0 | 0 | 0 | 0 | 6 | 10 | 3 |

As apparent from comparison between table 1 and table 2, the electroplating process using the leveling agents makes smaller the thickness of plated coat 13 over abrasive 11.

(4) Degree of Concentration of Abrasives Fixed on the Fixed Abrasive Wire

Examination was made about the degree of concentration of abrasives fixed on the fixed abrasive wire produced as described above (a value obtained by dividing the sum total of projected areas of abrasives fixed on the fixed abrasive wire per unit length by the surface area of the wire). Specifically, assuming that: the diameter of the wire is d, the length is L, and the projected areas of respective abrasives are A1, A2, A3, . . . , An, the degree of concentration is expressed by the following formula.

$$\text{Degree of concentration} = \{(A1+A2+A3+\ldots+An)/\pi dL\} \times 100(\%)$$

In the present example, 177 diamond abrasives were fixed on the wire in a certain length (365.5 μm) according to observation by a scanning electron microscope. Though abrasives have various shapes actually, the abrasives were regarded as spheres of the equal size for convenience of calculation. Further, though a projection of a sphere on a columnar wire takes the shape of ellipse actually, the projection of each abrasive was regarded as having a circular shape for convenience of calculation. On the assumption that 177 abrasives having equal diameter (18 μm) were fixed on the surface of a wire having a diameter of 160 μm and a length of 365.5 μm, the degree of concentration calculated according to the above formula was 25%.

(5) Surface Hardness of the Fixed Abrasive Wire

The surface hardness of the fixed abrasive wire produced as described above was measured at five points spaced about 0.1 mm from each other and, as a result, there were obtained values of 610 HMV(0.1), 620 HMV(0.1), 630 HMV(0.1), 650 HMV(0.1) and 680 HMV(0.1). "HMV" represents microvickers hardness.

(6) Slicing Operation by the Fixed Abrasive Wire

Figure 14:
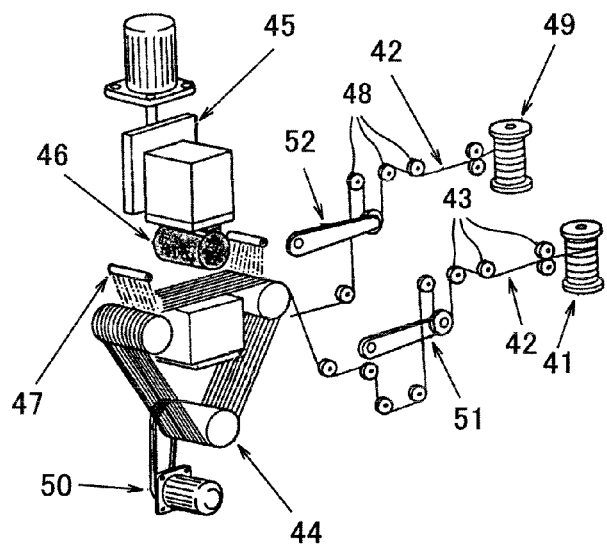
FIG. 14 is a view schematically showing the construction of a general wire saw apparatus.
Figure 15:
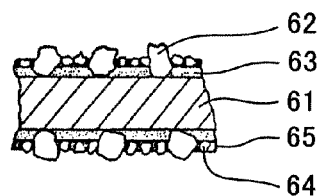
FIG. 15 is a sectional view showing the conventional abrasive electrodeposited wire.
Figure 16:
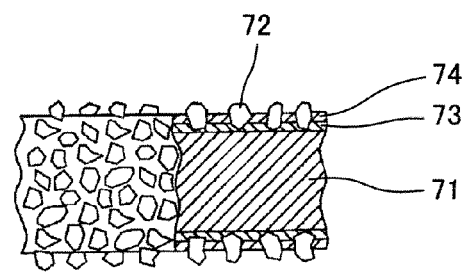
FIG. 16 is a sectional view showing another conventional abrasive electrodeposited wire.
Figure 17:
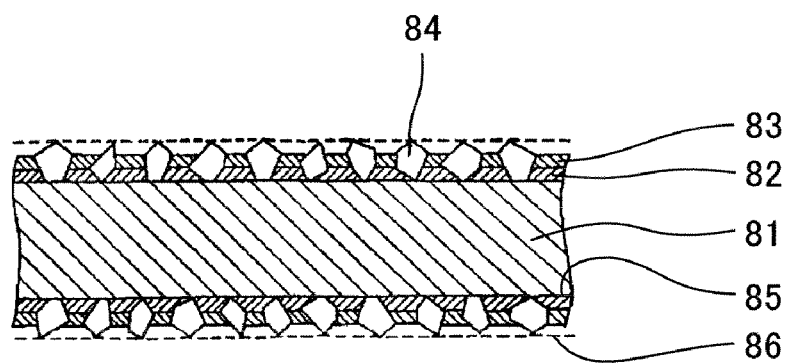
FIG. 17 is a sectional view showing yet another conventional abrasive electrodeposited wire.

Detailed description will be made about a slicing operation actually performed using the fixed abrasive wire obtained as described above. The arrangement of a wire saw is the same as in FIG. 14 and the object 46 to be cut was a flat plate of soda glass having a size of thickness 15 mm and width 125 mm and length 450 mm. The wire 42 was coiled around the groove rollers 44 at intervals of 0.95 mm with a tension of 25N. The soda glass 46 was cut for 25 minutes by a method wherein under spraying of city water from the nozzle 47 to the wire 42, the soda glass 46 to be cut was fed against the wire 42 at a speed of 1.0 mm/min while the wire 42 was advanced from the feed bobbin 41 toward the take-up bobbin 49 at 2 m/min in such a bidirectionally running manner that the wire 42 was fed from the feed bobbin 41 toward the take-up bobbin 49 at an average speed of 600 m/min and a maximum speed of 800 m/min and then the wire 42 was fed back from the take-up bobbin 49 toward the feed bobbin 41 at an average speed of 600 m/min and a maximum speed of 800 m/min.

Figure 8:
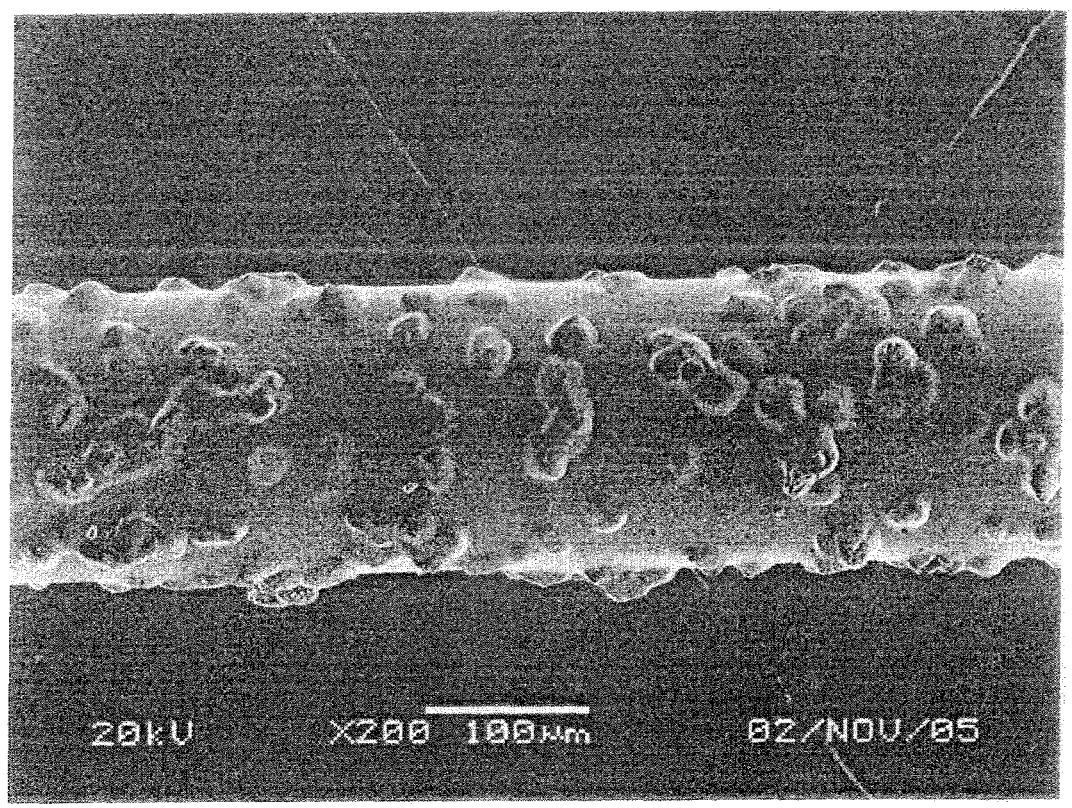
FIG. 8 is a photograph (200 magnifications) showing a surface of the fixed abrasive wire of the present invention before a slicing operation.
Figure 9:
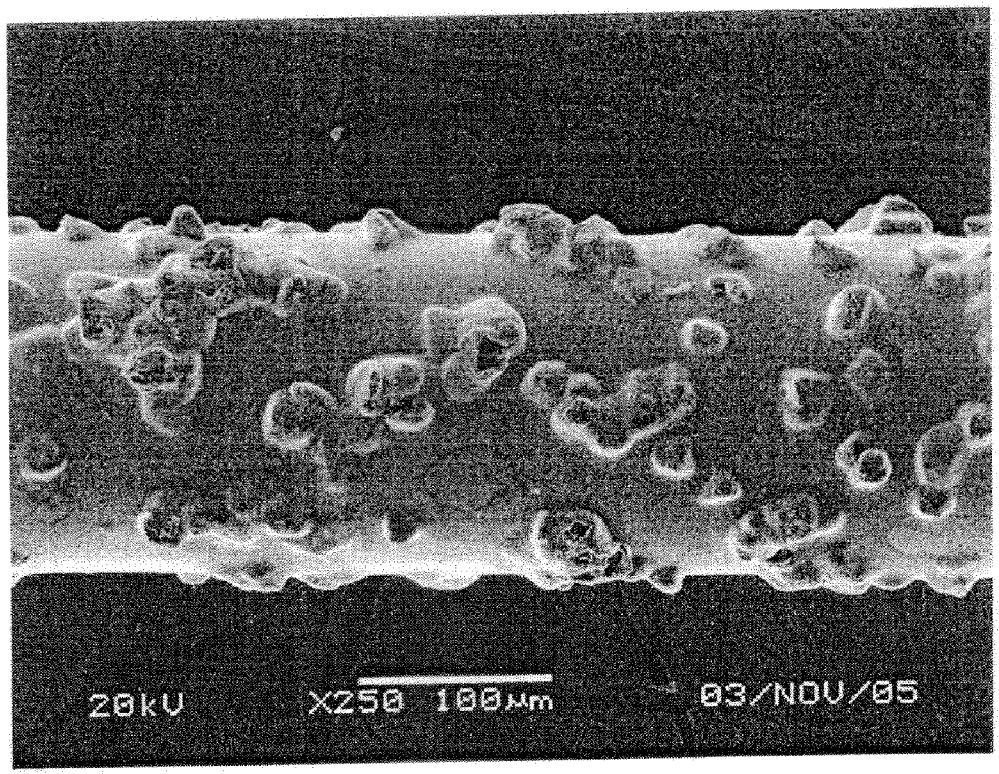
FIG. 9 is a photograph (250 magnifications) showing a surface of the fixed abrasive wire of the present invention after a slicing operation.

(7) Surface Conditions of the Fixed Abrasive Wire Before and after the Slicing Operations FIG. 8 is a photograph (200 magnifications) showing a surface of the fixed abrasive wire before the above slicing operation and FIG. 9 is a photograph (250 magnifications) showing a surface of the fixed abrasive wire after the above slicing operation. In FIGS. 8 and 9, a diamond abrasive is embedded immediately underneath each projecting portion. As apparent from comparison between FIGS. 8 and 9, there was observed no portion from which any diamond abrasive fell off or peeled off even after the slicing operation and, hence, the diamond abrasives were firmly fixed to the nickel-plated coat.

(8) Scratch Test

Figure 10:
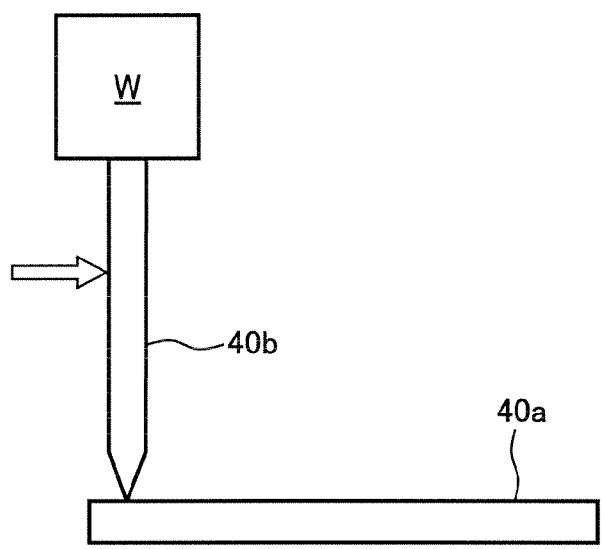
FIG. 10 is a view illustrating a scratch test method for the fixed abrasive wire of the present invention.
Figure 11:
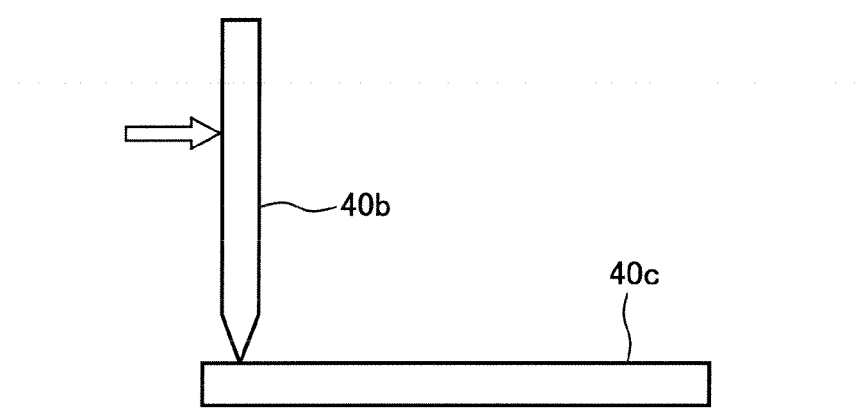
FIG. 11 is a view illustrating a scratch test method for a conventional abrasive electrodeposited wire.
Figure 12:
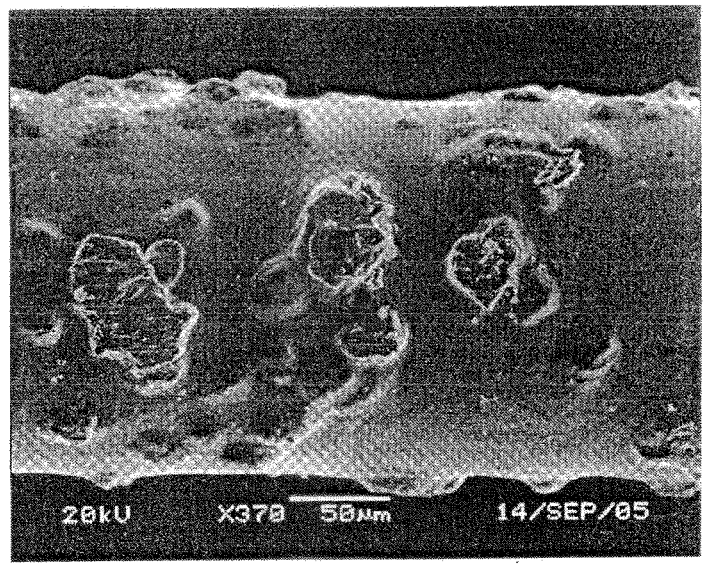
FIG. 12 is a photograph (370 magnifications) showing a surface of the fixed abrasive wire of the present invention after the scratch test.

For comparison, scratch tests were conducted using devices having respective constructions schematically shown in FIGS. 10 and 11. Specifically, as shown in FIG. 10, a scratch test was conducted wherein a member 40b having a sharp tip (made of low carbon steel and weighing 500 g) was pressed against the fixed abrasive wire 40a of the present invention produced as described above, a weight of 4500 g was put on the member 40b and then the sharp member 40b was pushed from the left toward the right at a speed of 1 cm/sec. As a result, the wire, which had exhibited a surface as shown in FIG. 8 before the scratch test, exhibited a surface as shown in FIG. 12. In FIGS. 8 and 12, a diamond abrasive is embedded immediately underneath each projecting portion. As apparent from comparison between FIGS. 8 and 12, there was observed no portion from which any diamond abrasive fell off or peeled off even after the scratch test and, hence, the diamond abrasives were firmly fixed to the nickel-plated coat.

Figure 13:
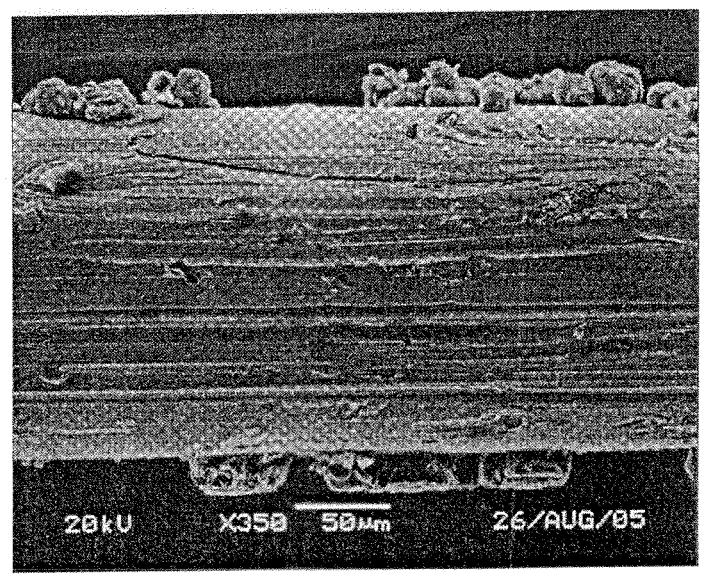
FIG. 13 is a photograph (350 magnifications) showing a surface of the conventional abrasive electrodeposited wire after the scratch test.
Figure 18:
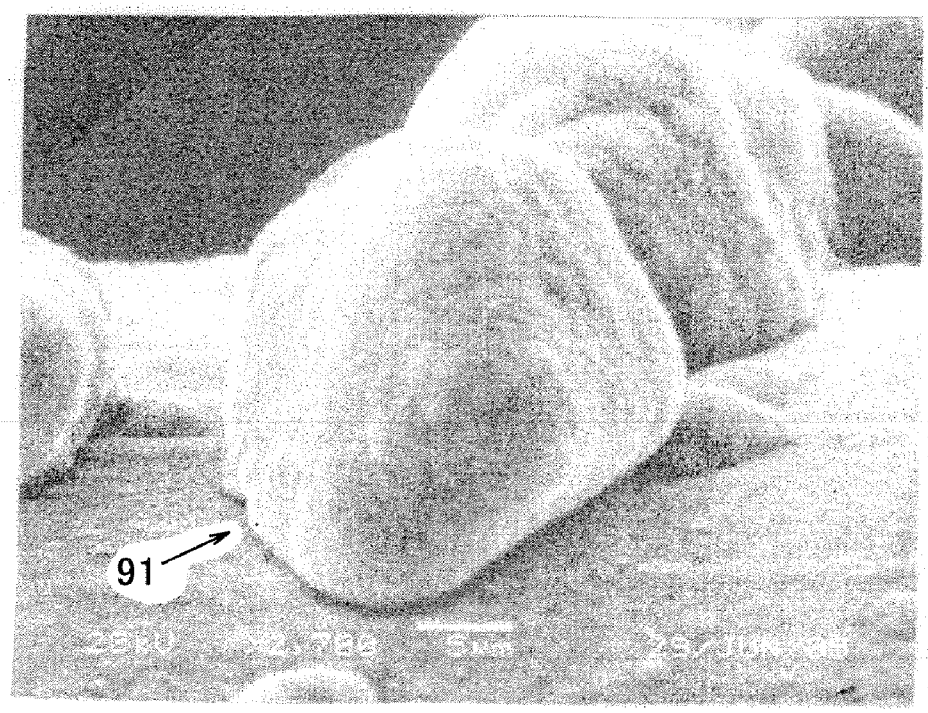
FIG. 18 is an enlarged photograph (2700 magnifications) showing a surface of a conventional abrasive electrodeposited wire.

Further, for comparison, a scratch test was conducted wherein the member 40b having a sharp tip (made of low carbon steel and weighing 500 g) was pressed against an abrasive electrodeposited wire 40c having a surface as shown in FIG. 18 and then the sharp member 40b was pushed from the left toward the right at a speed of 1 cm/sec, as shown in FIG. 11. As a result, the wire, which had exhibited the surface as shown in FIG. 18 before the scratch test, exhibited a surface as shown in FIG. 13. In FIGS. 13 and 18, a diamond abrasive is embedded immediately underneath each projecting portion. As apparent from comparison between FIGS. 13 and 18, many diamond abrasives fell off after the scratch test in spite of that fact that the weight imposed on this abrasive electrodeposited wire was 10% of the weight imposed in the scratch test conducted on the wire of the present invention.

(9) Conclusion

As described above, the present invention is capable of providing a fixed abrasive wire having a nickel-plated coat firmly fixed with diamond abrasives.

INDUSTRIAL APPLICABILITY

The fixed abrasive wire of the present invention can be used for cutting, slicing, internal grinding, dicing and ingot-cutting of such rigid materials as silicon, quartz, ceramics and the like.

The invention claimed is:

1. An abrasive electrodeposited wire having abrasives fixed thereon by electroplating and comprising, as a result of carrying out an electroplating using a plating solution containing a leveling agent and an abrasive, the wire has a surface coated with a metal-plated layer containing plural abrasives embedded therein, the surface of the metal-plated layer having curved-surface projecting portions each incorporating abrasives shaped to project from a substantially flat portion, all of the metal of the metal-plated layer selected to be responsive to a leveling agent during the electroplating;

wherein each of the curved-surface projecting portions has a height of H to a surface of the substantially flat portion and a horizontal sectional area of the curved-surface projecting portion increases as the curved-surface projecting portion extends from a height level of (⅓)H to the surface of the substantially flat portion and wherein a portion of the metal-plated layer disposed over a top portion of each of the abrasives has a thickness smaller than a thickness of a metal-plated layer formed over the top of the abrasives that would be obtained using a plating solution without a leveling agent.

2. An abrasive electrodeposited wire having abrasives fixed thereon and comprising, as a result of carrying out an electroplating using a plating solution containing a leveling agent and an abrasive, the wire has a surface coated with a metal-plated layer containing plural abrasives embedded therein, the surface of metal-plated layer having curved-surface projecting portions each incorporating abrasives shaped to project from a substantially flat portion, wherein a portion extending from the substantially flat portion to each of the curved-surface projecting portions has no inwardly depressed recess portion and a tangent to the portion extending from the substantially flat portion to each of the curved-surface projecting portions varies continuously and wherein a portion of the metal-plated layer disposed over a top portion of each of the abrasives has a thickness smaller than a thickness of a metal-plated layer formed over the top of the abrasives that would be obtained using a plating solution without a leveling agent.

3. An abrasive electrodeposited wire comprising:

a wire base metal having a surface;

a plurality of abrasives;

an electrodeposited metal-plated layer affixing the plurality of abrasives to the surface of the wire base metal, the electro-deposited metal-plated layer selected from a material responsive to a plating solution including a leveling agent;

the metal-plated layer arranged to have, in response to exposure to the leveling agent, a first thickness formed by an accelerated first rate of deposition of the metal-plated layer adjacent the surface of the wire base metal relative to a non-accelerated second rate of deposition of the metal-plated layer away from the surface of the wire base metal;

the metal-plated layer forming a substantially flat portion overlying the surface of the wire base metal;

the metal-plated layer further forming curved-surface projecting portions shaped to project from the substantially flat portion, the abrasives embedded within the curved-surface projecting portions of the metal-plated layer; and wherein a portion of the metal-plated layer that extends from the substantially flat portion and over the incorporated abrasives has no inwardly depressed recesses.

4. The abrasive electrodeposited wire of claim 3, wherein the metal-plated layer is deposited about the incorporated abrasives such that a tangent to the portion extending from the substantially flat portion and over the curved-surface projecting portions varies.

5. The abrasive electrodeposited wire of claim 3, wherein each of the curved-surface projecting portions has a height H measured to the substantially flat portion of the metal-plated layer, and wherein each of the curved-surface projecting portions defines a horizontal cross-sectional area A, and wherein the cross-sectional area A of each curved-surface projecting portion increases from a location measured at ⅓ of the height H toward the surface of the substantially flat portion.

6. An abrasive electrodeposited wire comprising:
a wire base metal having a surface;
a plurality of abrasives;
a contiguous metal-plated layer applied in a single electrolytic process, the metal-plated layer having a first region disposed adjacent the surface of the wire base metal and further having a second region disposed away from the surface of the wire base metal;
the first region forming a foot portion surrounding a lower portion of a corresponding one of the plurality of abrasives and affixing a lower portion of the corresponding one of the plurality of abrasives to the metal-plated layer;
the second region extending over the corresponding one of the plurality of abrasives to form a curved surface projecting portion;
the foot portion having a first cross-sectional area and the second region having a second cross-sectional area less than the first cross-sectional area; and
wherein the metal-plated layer is selected from a material responsive to a leveling agent in an electrodeposition plating solution to thereby deposit metal in the foot portion of the first region at a first rate of deposition and in the second region at a second and lesser rate of deposition.

* * * * *